United States Patent Office 3,288,023
Patented Nov. 29, 1966

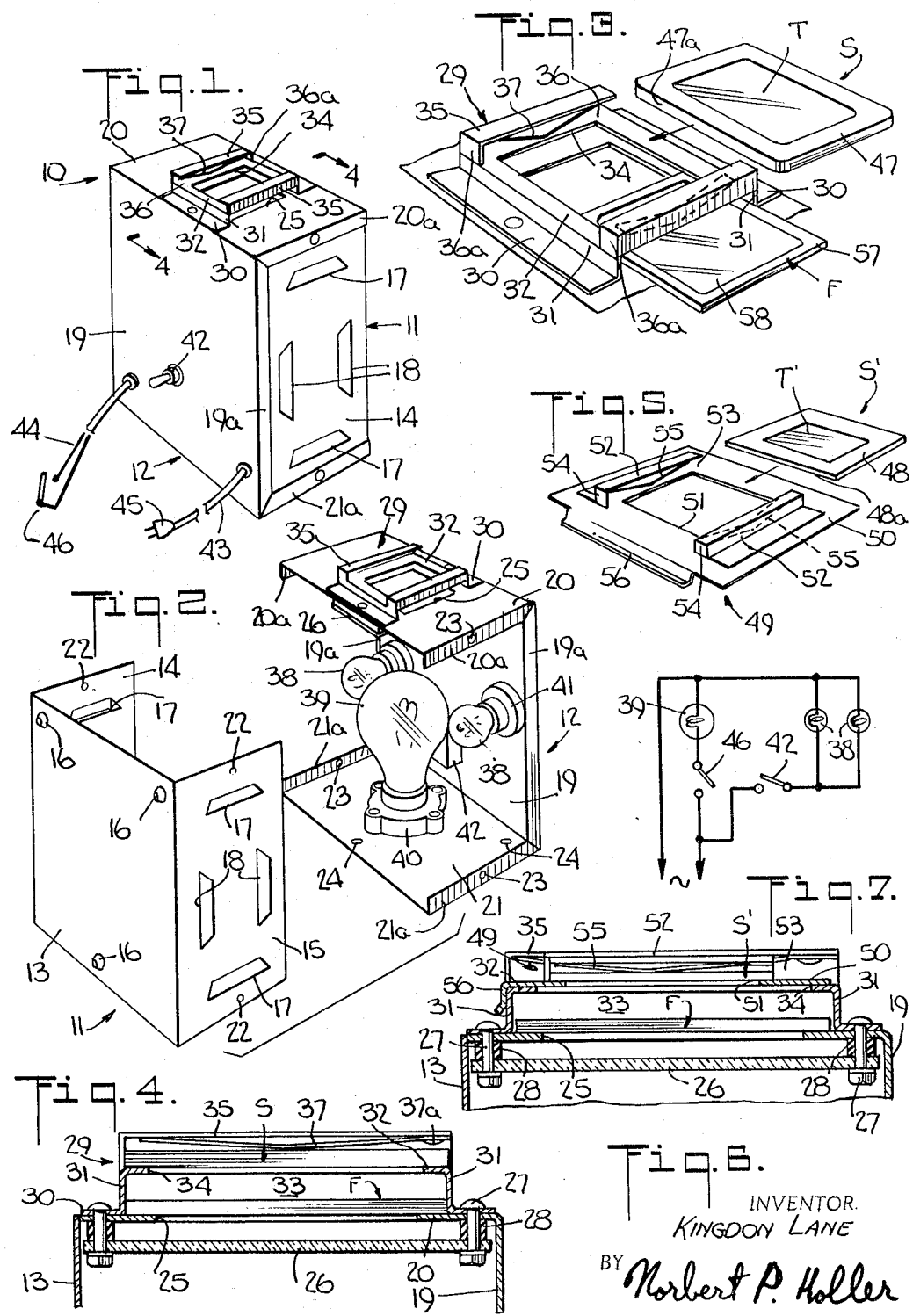

3,288,023
SLIDE COPYING APPARATUS
Kingdon Lane, 1200 Madison Ave., New York, N.Y.
Filed Apr. 27, 1964, Ser. No. 362,587
3 Claims. (Cl. 88—24)

This invention relates to photographic accessories, and in particular to apparatus usable in copying photographic slides or transparencies.

It is an object of the present invention to provide novel and improved apparatus with the aid of which slides or transparencies can be copied for reproduction as slides or photographs with practically no loss of detail by both amateur and professional photographers.

Another object of the present invention is the provision of a slide copying apparatus which is greatly simplified in construction and relatively inexpensive to produce.

Still another object of the present invention is the provision of such apparatus wherein slides may be copied both in color and in black and white, as well as with the camera aimed either horizontally or vertically downwardly Yet another object of the present invention is the provision of an apparatus as aforesaid adapted for copying slides of different frame thicknesses and widths.

The foregoing and other objects, characteristics and advantages of the present invention will be more clearly understood from the following detailed description thereof when read in conjunction with the accompanying drawing, in which:

FIG. 1 is an elevational view, in perspective, of a slide copying apparatus constructed in accordance with the present invention;

FIG. 2 is a similar perspective illustration of the same apparatus but with the parts reversed from the position shown in FIG. 1 and separated to show interior details;

FIG. 3 is a perspective illustration of the slide-holding means of the apparatus shown in FIGS. 1 and 2;

FIG. 4 is a fragmentary sectional view taken along the line 4—4 in FIG. 1;

FIG. 5 is a perspective illustration of a slide-holding adapter designed for use with the slide-holding means shown in FIGS. 3 and 4;

FIG. 6 is a fragmentary sectional view similar to FIG. 4 and shows the slide-holding adapter of FIG. 5 mounted in the slide-holding means of the apparatus; and FIG. 7 is a schematic wiring diagram of the electrical circuitry for the apparatus.

Referring now first to FIGS 1 and 2, it will be seen that the slide copying apparatus according to the present invention comprises a housing 10 composed of two separable, mated sections 11 and 12. The section 11 is preferably formed from a length of sheet metal which is bent along two spaced parallel lines into a relatively wide central panel 13 and two side panels 14 and 15 extending at right angles thereto and parallel to each other. Affixed to the outer surface of the panel 13 are three rubber feet 16 disposed at the apices of an isosceles triangle for a purpose to be more fully explained hereinafter. Each of the side panels 14 and 15 is provided with two pairs of elongated, struck-out vent openings 17 and 18 which are so arranged that the vents 17 all open in a downward direction when the housing section 11 is positioned as in FIGS. 1 and 2 while the vents 18 all open in the direction of the panel 13. The purpose of this arrangement will also be more fully explained hereinafter.

The housing section 12 is likewise preferably formed from a length of sheet metal which is bent along two spaced and parallel lines into a central panel 19 and two end panels 20 and 21 extending at right angles thereto and parallel to each other. At the opposite sides of the section 12, the panels 19 to 21 are provided with inwardly directed flanges 19a to 21a, respectively. The inner dimensions of the section 12 are such that the section 11 fits slidably and snugly between the panels 20 and 21 and between the opposed pairs of flanges 19a to 21a, and corresponding pairs of holes 22 and 23 are provided in the panels 14 and 15 of the section 11 and in the flanges 20a and 21a of the section 12 to enable the two sections to be bolted together as illustrated in FIG. 1. Affixed to the outer surface of the panel 21 of the section 12 are three rubber feet 24 (only two are shown) which are also arranged at the apices of an isosceles triangle.

The panel 20 of the housing section 12 is provided with a centrally disposed, substantially square opening 25 (see also FIGS. 4 and 6) which is about 2¼ inches by 2¼ inches in size, i.e. somewhat larger in both dimensions than the largest size transparency to be copied. Disposed below and extending across the entire expanse of the opening 25 is a flashed opal or milky white glass plate 26 which is supported by the panel 20 with the aid of nuts and bolts 27 and interposed rubber bushings 28. The sole function of these bushings is to provide a resilient and yieldable mounting for the glass plate 26 so that the same will not be cracked if for some reason, upon separation of the housing sections 11 and 12, the panel 20 is distorted from its normal state.

Mounted atop the panel 20 directly over the opening 25 is a slide-holding member 29 which comprises a pair of base flanges 30 secured to the panel 20 by means of the bolts 27. As clearly shown in FIGS. 3 and 4, the flanges 30 are integral with a pair of upstanding legs or flanges 31 which are integral with a plane platform 32 overlying the opening 25, whereby a psace or passageway 33 open only toward the opposed panel flanges 20a is defined between the undersurface of the platform 32 and the adjacent outer surface of the panel 20. The platform 32 is provided with a substantially square central opening 34 aligned with and of approximately the same size as the opening 25. At those of its sides overlying the open ends of the space or passageway 33 the platform 32 is provided with a pair of upwardly extending, channel-shaped flanges 35 which open inwardly of the member 29 and toward one another and define a pair of aligned, parallel tracks 36, these tracks being open at one end adjacent the panel 19 and closed at the other end by respective stops 36a. Disposed in each of the tracks or channels 36 is a respective bowed leaf spring 37 secured at one end, as shown at 37a, to the top of the channel flange 35 and having its apex bearing on or disposed in close proximity to the upper surface of the platform 32.

It will be noted that the space or passageway 31 is open in a direction transverse to the direction in which the tracks 36 are open. The advantage of this relationship will be more clearly understood as the description proceeds. It should also be noted that for ease of manufacture the entire member 29 preferably is made from a single piece of sheet metal suitably cut and bent to shape, although it may be made of several component parts joined to one another in the desired relationships.

Disposed within the confines of the housing section 11 are two small pilot light bulbs 38, each rated at 7 watts, for example, and a large photo flood bulb 39 rated, for example, at about 750 watts. As will be apparent from FIG. 2, the bulb 39 is arranged in a socket 40 secured to the panel 21 in axial alignment with the glass plate 26 and the openings 25 and 34, while the bulbs 38 are arranged in respective sockets 41 secured to the panel 19 on opposite sides of the widest part of the bulb 39. The panel 19 further supports an exteriorly accessible, manually operable switch 42 and is provided with two openings through which extend electric cords 43 and 44 connected at their free ends to a power supply plug 45 and a switch 46, respectively. As clearly shown in FIG. 7, the three bulbs are connected in parallel with one another across the power source (the wiring has been omitted in FIG. 2 for the sake of clarity), and the switches 42 and 46 are so arranged that the pilot light bulbs 38 on the one hand and the photo flood bulb 39 on the other may be energized independently of each other.

In the illustrated form of the invention, the switch 42 is preferably a simple "on-off" switch. The switch 46 may be either a foot-operated or a hand-operated "momentary" switch, i.e. one which is normally in the "off" position and stays in the "on" position only as long as pressure is applied to its operating pedal or lever. Alternatively, the switch 46 may also be a simple "on-off" switch, e.g. a standard snap or rocker switch or the like which stays in either its "on" or its "off" position until the operating lever or handle is positively displaced accordingly. It should be noted, however, that the switches 42 and 46 may be replaced by a single switch of the double-throw type generally known as a "center-off" switch, which can be so connected into the circuit that in one of its "on" positions the pilot lights are lit while in the other of its "on" positions the photo flood lamp is lit.

The slide-holding member 29 so far described is dimensioned to accommodate an oversize slide S (FIG. 3) comprising a transparency T about 2 inches by 2 inches in size mounted in a metal frame 47 about 2¾ inches by 2¾ inches in size. The member 29 alone cannot, however, be used to copy a standard size slide S′ (FIG. 5) of the type having a small transparency T′ about 1 inch by 1½ inches in size mounted in a cardboard frame 48 measuring 2 inches by 2 inches, inasmuch as the size of the opening 34 in the platform 32 is greater than that of the slide S′. Accordingly, a slide-holding adapter 49 is provided by the present invention, which can be mounted in the tracks 36 of the member 29 and is itself provided with similar tracks to hold the smaller slide S′.

Referring now particularly to FIGS. 5 and 6, it will be seen that the adapter 49 comprises a plane platform 50 about 2¾ inches by 2¾ inches in size and provided with a central square opening 51 about 1⅝ inches by 1⅝ inches in size at the opposite sides of which are positioned two channel-shaped flanges 52 defining a pair of tracks 53 closed at one end by stops 54. Arranged in the tracks 53 are two bowed leaf springs 55 the apices of which engage or are disposed in close proximity to the upper surface of the platform 50. The platform 50 is further provided at one edge with a downwardly depending flange or hook element 56. The adapter 49 in toto may, of course, be made of a single piece of sheet metal suitably cut and bent to the desired shape, or it may be made from a plurality of preshaped sections secured to each other in the desired relationships. As clearly shown in FIG. 6, the arrangement is such that when the adapter 49 is to be used, it is fitted into the tracks 36 of the member 29, with the flange 56 at the leading edge, until the flange 56 drops over the edge of the platform 32 between the stops 36a.

The manner of operation and use of the apparatus according to the present invention will now be described.

It is assumed, of course, that the housing sections 11 and 12 have been secured to one another in the proper relationship to define the complete housing 10 (FIG. 1). In view of the fact that the housing sections must be so connected to one another to ensure that the vents 17 open in a direction away from the slide-holding member 29, a suitable index marking of any desired readily noticeable type, for example a colored line or group of lines, may be provided on the inner surface of the panel 13 at the edge thereof adjacent the pair of rubber feet 16, to indicate that this end of the housing section 11 should face the end of the housing section 12 on which the slide-holding member 29 is mounted. Alternatively, for example, the holes 22 in at least one of the panels 15 of the section 11 might be located different distances from the panel 13, with at least one pair of the holes 23 in the flanges 20a being correspondingly offset.

If the photograph of the slide to be copied is to be taken vertically, the housing 10 is positioned as in FIG. 1 and thus is supported on the three rubber feet 24. The use of the three rubber feet 24 provides a self-leveling tripod effect, ensuring that the housing will be stably positioned on the supporting surface therefor without any need for adjustment of the feet, as would be required if four such supporting elements were employed.

A slide S to be copied is now inserted edgewise into the tracks 36 of the holding member 29 from the open end of said tracks, until the leading edge 47a of the slide frame 47 abuts against the stops 36a. As this slide is pushed into the tracks 36, of course, the frame of the slide displaces the springs 37 upwardly and thereby is securely frictionally retained in the holding member against accidental shifting in the tracks. When the slide S is fully inserted, the transparency T is centered over the openings 31 and 25.

If desired, or necessary, one or more suitable filters F (FIG. 3) is concurrently inserted into the space or passageway 33 beneath the slide-holding platform 32. Preferably, each such filter is composed of a frame 57 of essentially the same dimensions as the platform 32, and of a transparent filter element 58 at least as large as the transparency T of the slide S and advantageously as large as the openings 25 and 34. Obviously, the element 58 in any given filter F may be a color filter element or a texture filter element. As clearly shown in FIGS. 4 and 6, the space or passageway 33 is sufficiently high to accommodate a plurality of filters in a stack depending on the particular effect to be produced.

The switch 42 is now flipped to its on position, whereby the pilot bulbs 38 light up and provide a limited amount of light through the glass plate 26 and the transparency T of the slide S. The slide can thus be viewed and the camera (not shown) properly aimed and focused relative thereto. As soon as these preliminary operations have been completed, the switch 46 is operated to its on position to light up the photo flood bulb 39, which provides the high intensity illumination required for taking a photograph of the transparency T. If desired, prior to the actual photographing operation the flood lamp may be turned on for an instant while a light meter is held adjacent the slide, to enable the operator to determine the light intensity for setting the camera shutter speed and lens aperture accordingly. The fact that the pilot lights are still on when the switch 46 is closed both during the light measuring operation and the photographing operation is of no importance, inasmuch as the light from the photo flood bulb is of sufficient intensity to completely drown out the light from the pilot lights. As soon as the required exposure time has passed, which will ordinarily be in the vicinity of about 1 to 2 seconds at most, the switch 46 is returned to its off position to turn the flood lamp 39 off. The switch 42 is then also opened, whereupon the apparatus can be readied for the next slide-copying operation.

It will be readily understood that if a smaller slide S′ is to be copied, the procedure to be followed is identical with that just described except that the operator first inserts the adapter 49 into the tracks 36 of the member 29 until the flange 56 hooks over the edge of the platform 32 between the stops 36a, whereupon he inserts the slide S′ into the tracks 53 of the adapter until the leading edge 48a of the frame 48 comes up against the stops 54.

It will further be understood that in either case the slide to be copied may be photographed with the camera aimed horizontally. In that event, it is only necessary to rest the housing 10 on the three feet 16 the tripod effect of which is the same as that of the feet 24. Even for such horizontal operation, however, it will be noted that the filter (or filters) F are secure against falling out of the space or passageway 33 since the bottom of the latter constituting the filter support is now defined by one of the flanges 31 (the left-hand one in FIGS. 4 and 6) extending between the platform 32 and the associated mounting flange 30.

The principal advantage acruing from the prescribed orientation of the vent openings 17 and 18 (aside from their ventilating function) will now be apparent. The light emitted by the photo flood lamp 39 is extremely bright, and might bother the eyes of the operator if permitted to reach them. The arrangement of the vents is such, however, that irrespective of the direction (vertically or horizontally) in which the slide is being photographed, the vents are always closed in the direction of the camera, whereby none of the light of the flood lamp can reach the eyes of the person operating the camera.

A further advantage of the apparatus according to the present invention results from the presence of the pilot lights 38. As previously explained, these are used for the relatively lengthy (compared to exposure time) viewing and focusing operations. Thus it is not necessary to use the flood lamp 39 for these purposes, whereby the useful life of this lamp is considerably extended and premature burning out thereof avoided. The use of the separate switches 42 and 46 in this connection is also advantageous in that it permits the operator to actuate the flood lamp while standing near the camera and in a position where the possibility of accidental interference by a part of his body with the photographing operation is practically eliminated. Moreover, since the operator does not have to turn the pilot lights off prior to photographing the slide, the possibility of shifting of the slide out of the focus of the camera is also avoided.

It will be understood that if the housing is equipped with only a center-off switch, the same procedures as are outlined will be followed except that this switch is first moved to one of its on positions to turn on the pilot lights. Thereafter, the switch is moved through its off position to its second on position to turn on the flood lamp, while after the exposure the switch is returned to its off position. With this arrangement, of course, the operator must exercise extreme care not to shift the housing 10 out of its aligned position while he is operating the switch, or he must provide some means for clamping or otherwise immobilizing the housing.

While there has been described herein a preferred embodiment of the apparatus according to the present invention, the description and accompanying illustrations of various aspects and details thereof are deemed to be representative only, and it is clear that a number of changes and modifications may be made in the manner and means of implementing the principles of the present invention without any departure from the spirit and scope thereof as defined by the hereto appended claims.

Having thus described my invention, what I claim and desire to secure by Letters Patent is:

1. A slide-copying apparatus, comprising a housing having in one wall thereof an opening larger than the largest slide transparency to be copied, a first slide-holding member carried by said housing in spaced overlying relationship to said opening and provided with a first aperture aligned with said opening and smaller than the frame of the largest slide but larger than either the transparency thereof or the frame of the smallest slide to be copied, a high power light source and a low power light source located within said housing and arranged to direct light toward and through said opening, a flashed opal glass plate located within said housing and arranged across said opening, switch means connected with said light sources to permit energization of said low power light source independently of said high power light source, a second slide-holding member provided with a second aperture smaller than the frame but larger than the transparency of the smallest slide to be copied, means on said second member for holding the frame of said smallest slide fixedly in position with the transparency thereof overlying said second aperture, and means on said first member for selectively holding either said second member or said largest slide fixedly in position with either said second aperture or said largest slide transparency in alignment with said first aperture and said opening.

2. Apparatus according to claim 1, said holding means on each of said first and second members comprising spring means arranged to press a slide frame against the surface bounding the associated aperture.

3. A slide-copying apparatus, comprising a housing having an opening in one wall thereof, means arranged to direct high power light toward and through said opening outwardly from said housing, means arranged to direct low power light toward and through said opening outwardly from said housing, means operable selectively to effectuate the direction of said low power light toward said opening independently of said high power light, a first slide-holding member carried by said housing in spaced overlying relationship to said opening and provided with a first aperture aligned with said opening, said first aperture being smaller than the frame of the largest slide to be copied but larger than either the transparency thereof or the frame of the smallest slide to be copied, a second slide-holding member provided with a second aperture smaller than the frame but larger than the transparency of the smallest slide to be copied, means on said second member for holding the frame of said smallest slide fixedly in position with the transparency thereof aligned with said second aperture, and means on said first member for selectively holding either said second member or said largest slide fixedly in position with either said second aperture or said largest slide transparency in alignment with said first aperture and said opening.

References Cited by the Examiner
UNITED STATES PATENTS
3,060,796   10/1962   Muse _____ 88—24

NORTON ANSHER, *Primary Examiner.*

R. A. WINTERCORN, *Assistant Examiner.*